US006866278B2

(12) United States Patent
Gochioco

(10) Patent No.: US 6,866,278 B2
(45) Date of Patent: Mar. 15, 2005

(54) SMALL MAN-POWERED BUMP CAR

(76) Inventor: Malcolm C. Gochioco, 17128 E. Colima Rd., Suite 515, Hacienda Heights, CA (US) 91745

( * ) Notice: Subject to any disclaimer, the term of this patent is extended or adjusted under 35 U.S.C. 154(b) by 0 days.

(21) Appl. No.: 10/412,061

(22) Filed: Apr. 11, 2003

(65) Prior Publication Data

US 2004/0201210 A1 Oct. 14, 2004

(51) Int. Cl.⁷ .................................................. B62M 1/14
(52) U.S. Cl. ................................................... 280/242.1
(58) Field of Search .............................. 280/242.1, 218, 280/244, 246, 249, 263, 771

(56) References Cited

U.S. PATENT DOCUMENTS

| | | | | |
|---|---|---|---|---|
| 3,902,739 A | * | 9/1975 | Kimura | 280/249 |
| 6,386,304 B1 | * | 5/2002 | Wang | 180/65.1 |
| 6,499,755 B2 | * | 12/2002 | Gu | 280/210 |
| 6,561,534 B2 | * | 5/2003 | Gu | 280/242.1 |
| 6,722,674 B2 | * | 4/2004 | Gu et al. | 280/87.021 |

* cited by examiner

Primary Examiner—Faye M. Fleming
(74) Attorney, Agent, or Firm—Jen-Feng Lee, Esq.

(57) ABSTRACT

A small man-powered bump car that requires only human muscle as its energy source. Extended play, either individually or in a group, can be enjoyed by riders of the bump car in a relatively level ground. Riders are safely enclosed in a body panel while engaging in a healthy sport.

7 Claims, 4 Drawing Sheets

TOP VIEW

SECTION VIEW

BOTTOM VIEW

Side view of steering columns with joint

SMALL MAN-POWERED BUMP CAR

FIELD AND BACKGROUND OF THE INVENTION

The present invention relates generally to a toy/sport item that employs human weight and arms strength to drive and control the car. Present invention, just like traditional roller skates and skateboards, requires no energy consumption, except that of human muscle.

More particularly, present invention integrates the drive force and control of direction into a single mechanism.

DESCRIPTION OF THE PRIOR ART

Traditional bump cars, or similar toy items, usually require some kind of power source to drive the cars. Typical power source includes onboard battery, gasoline engine or DC/AC current flowing through a metal rod connecting to a ceiling and a metal ground that conduct electricity.

In these prior art implementations, the traditional toy cars consumes energy to provide driving force for the cars, while the riders of the cars steer the direction of the cars when riding the cars.

Due to the nature of these prior art implementations, the popularity of these traditional toy cars is limited by their power supply (electricity available in the battery, or the gasoline) or its environment (metal rod with ceiling and ground).

Present invention creates a new kind of man-powered bump car that will give riders greater freedom for extended play without limitation by its environment or the supply of external power.

DESCRIPTION OF THE DRAWINGS

The accompanying drawings, which are incorporated in and constitute a part of this specification, illustrate the preferred embodiment of the invention and together with the description, serve to explain the principles of the invention.

A brief description of the drawings is as follows.

DETAILED DESCRIPTION OF THE PREFERRED EMBODIMENT

Figure 1:
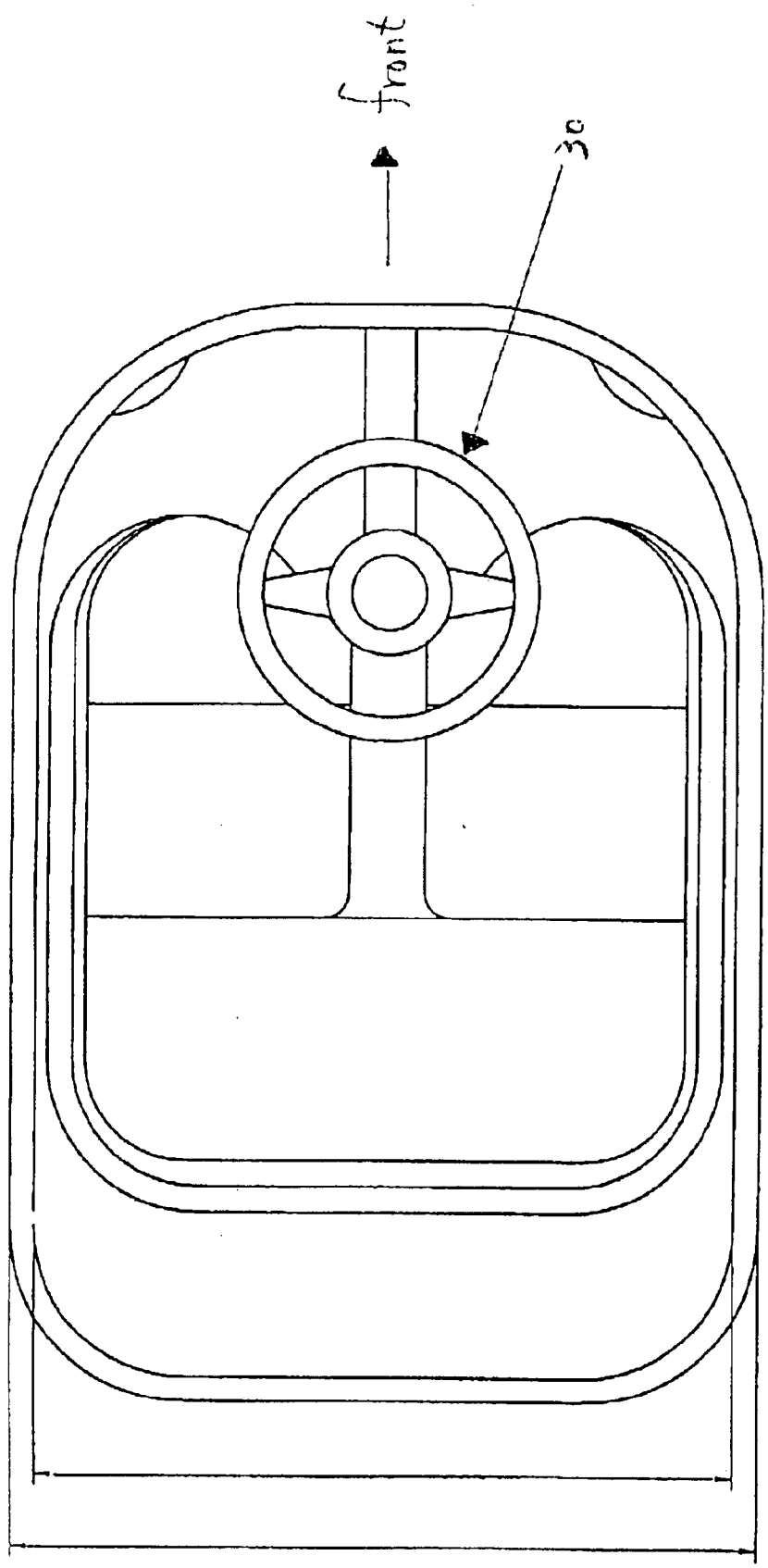
FIG. 1 shows the top view of the man-powered bump car envisioned by present invention.

In FIG. 1, a steering wheel 30 is shown. A rider of present invention can hold on to said steering wheel 30 and make consecutive left and right turns that generate a forward-moving force to propel the small bump car.

Figure 2:
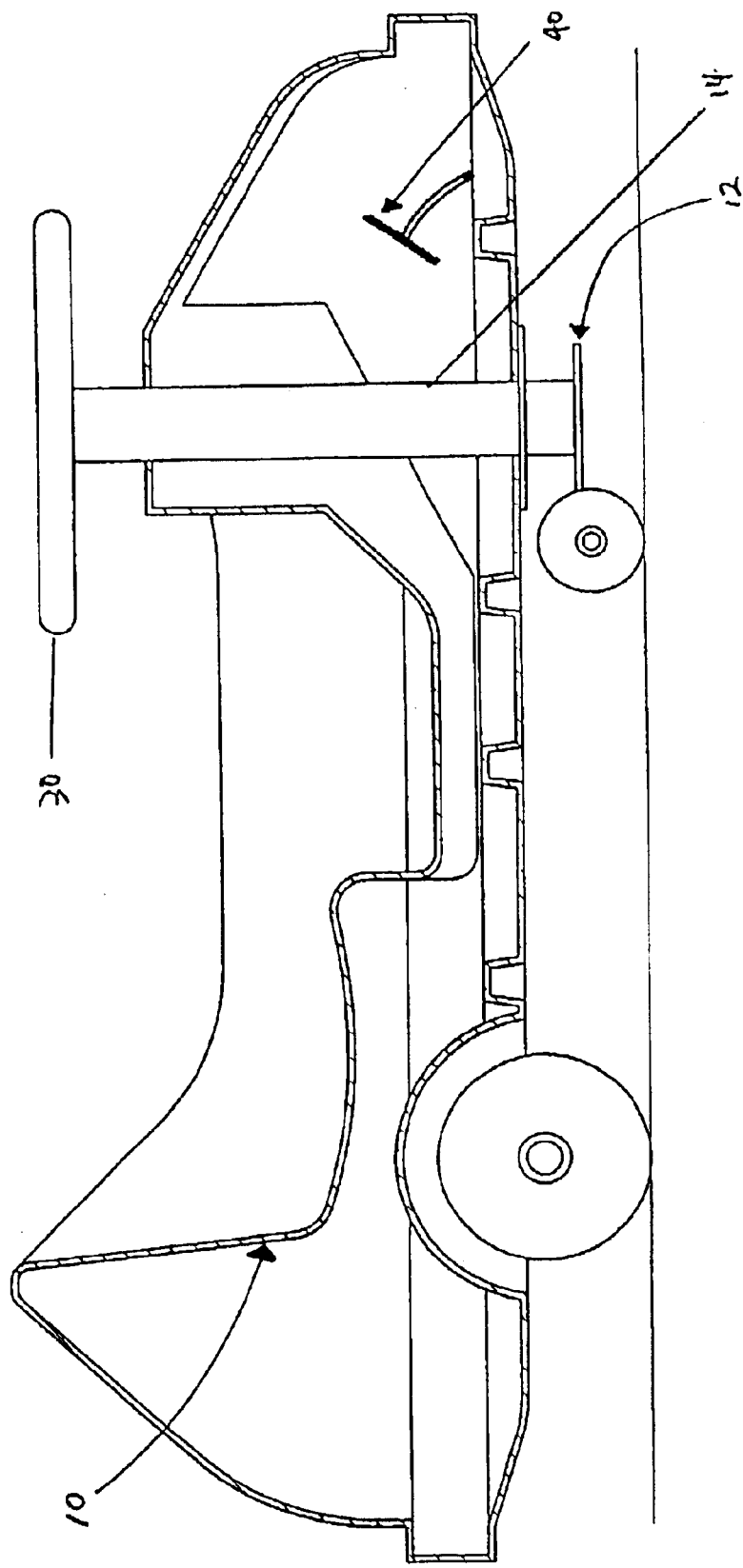
FIG. 2 shows the side/section view of the man-powered bump car envisioned by present invention.

FIG. 2 shows the side/section view of present invention. Steering wheel 30 is connected to the rigid bottom plate 12 by a vertical rigid column 14. The point at which said rigid column 14 is attached to said bottom plate 12 is some distance away from the center of the front axle 130, towards the front of the bump car.

Body panel 10 can be integrated into the chassis at the bottom of which the front axle 130 and rear axle 230 are attached.

Figure 3:
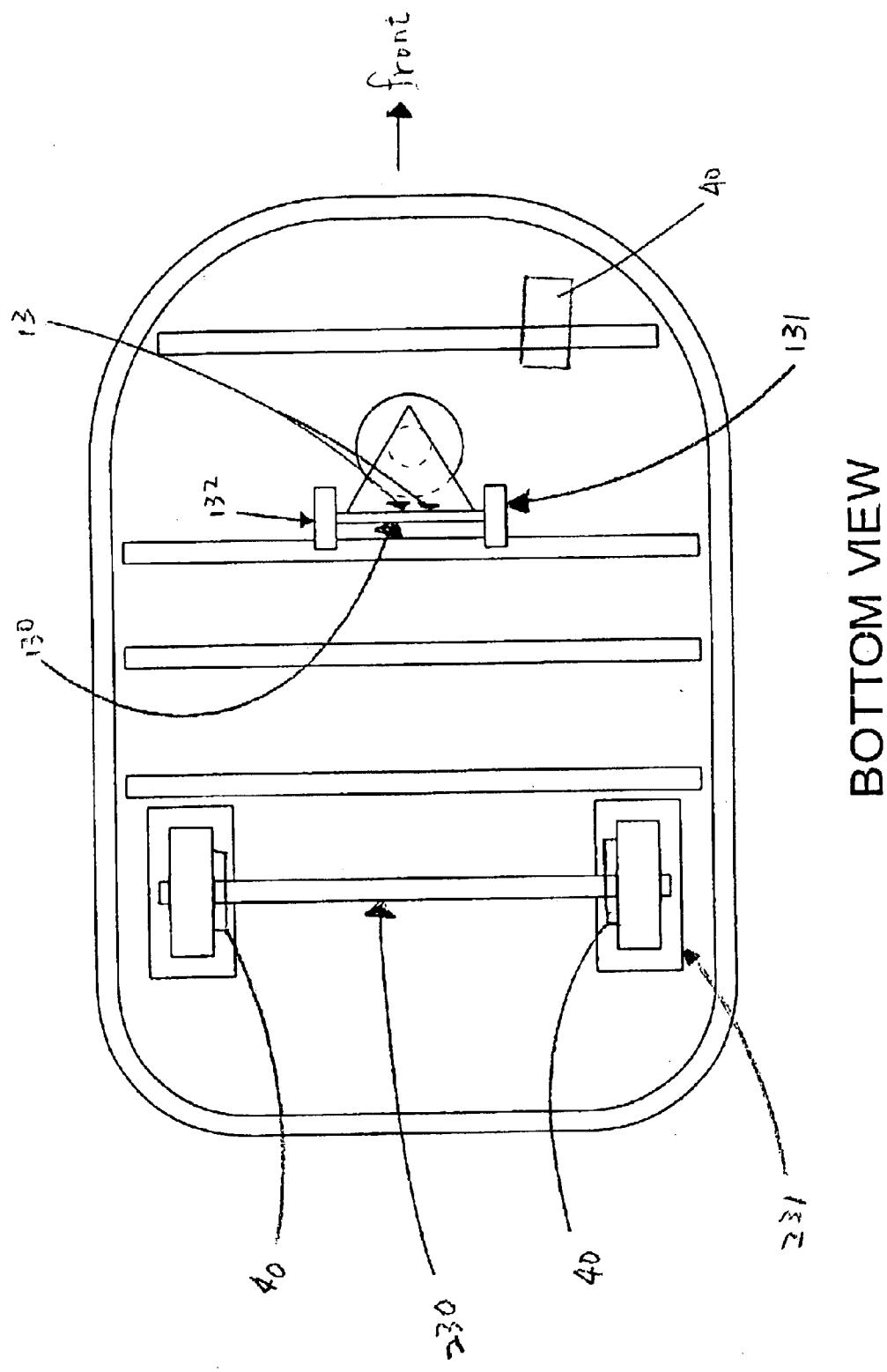
FIG. 3 shows the bottom view of the man-powered bump car envisioned by present invention.

FIG. 3 shows the bottom view of present invention. At both ends of the rear axle 230, left and right wheel assemblies are located. The left rear wheel assembly 231 can be one single wheel or multiple wheels. The right wheel assembly 232 can be one single wheel or multiple wheels. Said rear wheel assemblies only provide load-bearing function to the bump car.

Optional braking mechanism 40 is shown in FIG. 2 and 3 where disc or drum brake can be employed to the rear wheel assemblies.

The two front wheels (131 and 132) will generate an alternating-step motion when the bottom plate 12 is being turned left and right repeatedly by rider's arms holding the steering wheel 30 that transmits the left-and-right turning down to the plate through the rigid column 14.

The left-and-right turning of the steering wheel 30 generates the forward-moving momentum. By-standers will observe a yawing effect in the front portion of the bump car while the car propels forward.

Once a forward-moving momentum is generated, a rider can temporarily stop the left-and-right turning of the steering wheel 30, thus stopping the yawing effect of the bump car, until the rider decides to add more forward-moving momentum again to the bump car by holding the steering wheel 30 and turning it left and right.

Once a forward-moving momentum is generated, a rider can control the direction of the bump car by turning the steering wheel 30 to the desired direction.

Figure 4:
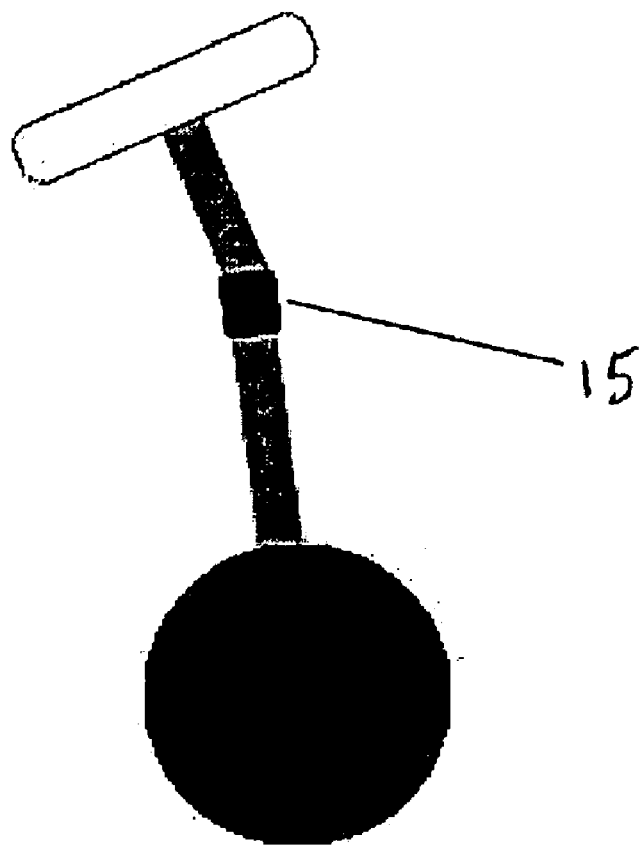
FIG. 4 shows the construction of rigid column can be implemented by sections of rigid column connected by joints.

To enhance the construction flexibility as well as the maneuverability of the bump car in present invention, rigid column 14 can be made up of two or more sections of columns with joints 15 connecting the sections, as show in FIG. 4.

Light and rigid materials are used to form the seat and the body panel 10 for the bump car. Said body panel 10 also may optionally include a layer of cushioning material at its very outer flank to provide for shock absorption when multiple players are present.

What is claimed is

1. A small man-powered bump car, comprising:
   a. A rigid chassis;
   b. A rigid rear axle having a right wheel assembly and a left wheel assembly;
   c. A rigid bottom plate having a front axle attached at first side of said plate, wherein said front axle further having right and left wheels that are smaller than said rear axle wheel assemblies;
   d. A vertical rigid column attached to said bottom plate so that the point of attachment and said front right and left wheels form a triangular shape on said bottom plate; and
   e. A steering wheel attached at the upper end of said rigid column so that the turning of said steering wheel would result in the turning of said bottom plate.

2. The small man-powered bump car of claim 1, wherein said rigid chassis has means at the bottom to fixedly secure said rear axle.

3. The small man-powered bump car of claim 2, wherein said rigid chassis has means at the bottom to rotatably hold said rigid column, allowing said steering wheel to turn and thus control the turn angle of said rigid column and bottom plate.

4. The small man-powered bump car of claim 3, wherein said right or left wheel assembly of rear axle may contain one or a plurality of wheels.

5. The small man-powered bump car of claim 4, wherein said bottom plate is in the shape of a triangle.

6. The small man-powered bump car of claim 5, wherein said rigid column can be formed by using two or more sections of rigid columns connected by joints.

7. The small man-powered bump car of claim 6 further having a wrap-around panel and seat arrangement to allow a rider to situate his/her body with arms reaching to said steering wheel.

* * * * *